United States Patent
Ro

(10) Patent No.: US 8,847,552 B2
(45) Date of Patent: Sep. 30, 2014

(54) BATTERY PACK AND METHOD OF CONTROLLING THE SAME

(75) Inventor: Hun-Tae Ro, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 588 days.

(21) Appl. No.: 12/960,444

(22) Filed: Dec. 3, 2010

(65) Prior Publication Data

US 2011/0305925 A1 Dec. 15, 2011

(30) Foreign Application Priority Data

Jun. 9, 2010 (KR) ........................ 10-2010-0054501

(51) Int. Cl.
*H02J 7/00* (2006.01)
*H01M 10/44* (2006.01)
*H01M 10/48* (2006.01)
*H01M 10/42* (2006.01)

(52) U.S. Cl.
CPC ........... *H01M 10/482* (2013.01); *H02J 7/0026* (2013.01); *Y02E 60/12* (2013.01); *H01M 10/441* (2013.01); *H02J 7/0021* (2013.01); *H01M 10/425* (2013.01); *H01M 2200/103* (2013.01)
USPC .......................................... 320/134; 320/125

(58) Field of Classification Search
CPC .................................................... H02J 7/0031
USPC .................. 320/116, 125, 150, 134
See application file for complete search history.

(56) References Cited

U.S. PATENT DOCUMENTS

| 5,451,880 A * | 9/1995 | Yamagishi et al. ........... 324/429 |
| 6,680,600 B2 | 1/2004 | Emori et al. |
| 6,977,480 B2 * | 12/2005 | Emori et al. .................. 320/104 |
| 2010/0085014 A1 | 4/2010 | Saeki et al. |

FOREIGN PATENT DOCUMENTS

| JP | 2004-031268 | 1/2004 |
| JP | 2004-287787 | 10/2004 |
| JP | 2008-071568 | 3/2008 |
| JP | 2010-93876 | 4/2010 |
| KR | 2003-0043578 | 6/2003 |

OTHER PUBLICATIONS

Machine English Translation of JP 2004-031268.
Machine English Translation of JP 2004-287787.
Machine English Translation of JP 2008-071568.
Office action dated Apr. 17, 2012 in corresponding Korean Patent Application No. 10-2010-0054501, 4pp.
Machine English Translation of JP 2004-031268, Jan. 29, 2004.
Machine English Translation of JP 2004-287787, Oct. 14, 2004.
Machine English Translation of JP 2008-071568, Mar. 27, 2008.

* cited by examiner

*Primary Examiner* — Yalkew Fantu
(74) *Attorney, Agent, or Firm* — Christie, Parker & Hale, LLP

(57) ABSTRACT

A battery pack blocks a current flowing between battery cells coupled in parallel among a plurality of battery cells coupled in series and in parallel while measuring voltages so as to prevent a battery cell in a low-voltage state from being automatically charged through a battery cell coupled in parallel to the battery cell in a low-voltage state, and the battery pack accurately determines whether there is an abnormal battery cell by detecting voltages of battery cells coupled in series, thereby performing accurate measurement.

8 Claims, 4 Drawing Sheets

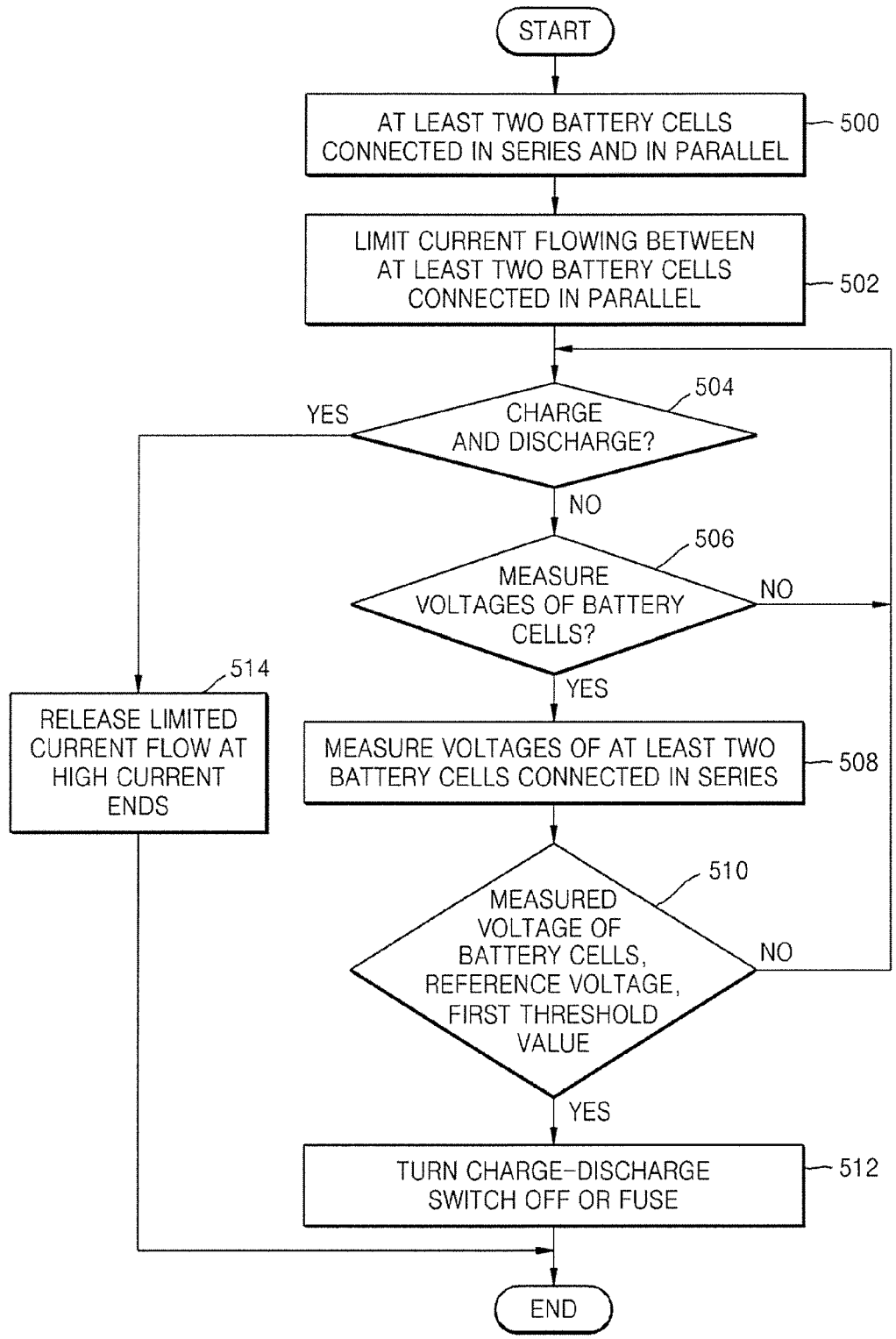

BATTERY PACK AND METHOD OF CONTROLLING THE SAME

CROSS-REFERENCE TO RELATED APPLICATION

This application claims priority to and the benefit of Korean Patent Application No. 10-2010-0054501, filed on Jun. 9, 2010, in the Korean Intellectual Property Office, the entire content of which is incorporated herein in its entirety by reference.

BACKGROUND

1. Field

Aspects of one or more embodiments of the present invention relate to a battery pack and a method of controlling the same.

2. Description of the Related Art

Research into rechargeable batteries has been actively conducted due to the development of portable electronic devices such as cellular phones, laptop computers, camcorders, personal digital assistants (PDAs), and the like. The rechargeable battery may be any of various types such as a nickel-cadmium battery, a lead storage battery, a nickel metal hydride battery (NiMH), a lithium ion battery, a lithium polymer battery, a metal lithium battery, or an air zinc battery. The rechargeable battery may be combined with a circuit so as to constitute a battery pack, and the rechargeable battery is charged and discharged through an external terminal of the battery pack.

A typical battery pack includes a battery cell and a peripheral circuit including a charge-discharge circuit, wherein the peripheral circuit is prepared as a printed circuit board and then is combined with the battery cell. When an external power source is coupled to an external terminal of the battery pack, the battery cell is charged by external power supplied through the external terminal and the charge-discharge circuit. When a load is coupled to the external terminal, power of the battery cell is supplied to the load through the charge-discharge circuit and the external terminal. Here, the charge-discharge circuit controls charging and discharging of the battery cell occurring between the external terminal and the battery cell. In general, a plurality of battery cells are coupled in series or in parallel according to a consumption of a load.

SUMMARY

One or more embodiments of the present invention are directed toward a battery pack in which unbalanced or low-voltage battery cells among a plurality of battery cells may be prevented or reduced, and a method of controlling the battery pack.

One or more embodiments of the present invention include a battery pack that can identify an abnormal battery cell.

One or more embodiments of the present invention include a battery pack that may block current flowing between battery cells coupled in parallel among a plurality of battery cells coupled in series and in parallel while measuring a voltage so as to prevent a battery cell in a low-voltage state from being automatically charged by battery cells coupled in parallel to the battery cell, and that may accurately determine whether there is an abnormal battery cell by detecting a voltage of each of battery cells coupled in series, thereby performing accurate measurements, and a method of controlling the battery pack.

Additional aspects of the present invention will be set forth in part in the description which follows and, in part, will be apparent from the description, or may be learned by practice of the presented embodiments.

According to one or more embodiments of the present invention, a battery pack includes a protective circuit, a plurality of battery cells coupled with the protective circuit, the plurality of battery cells being coupled in series and in parallel, and a plurality of current limiting devices each coupled between corresponding battery cells that are coupled in parallel among the plurality of battery cells.

The plurality of current limiting devices may include at least two current limiting devices each being coupled to at least two battery cells coupled in parallel among the plurality of battery cells.

The battery pack may further include at least one switch coupled in parallel to at least one of the current limiting devices.

The at least one switch may be turned on while charging or discharging the plurality of battery cells.

The protective circuit may be configured to measure voltages of at least two battery cells coupled in series among the plurality of battery cells.

The at least one switch may be turned off when measuring voltages of at least two battery cells coupled in series among the plurality of battery cells.

The protective circuit may be configured to compare measured voltages with a reference voltage, and turn off a charge-discharge switch that controls charging or discharging of the plurality of battery cells or blow a fuse on a high current path (HCP) of the plurality of battery cells when a difference between any of the measured voltages and the reference voltage is equal to or greater than a first threshold value.

The at least one switch may include a field effect transistor (FET).

The current limiting devices may include positive temperature coefficient (PTC) devices.

The current limiting devices may include resistors.

According to one or more embodiments of the present invention, a battery pack includes a protective circuit, a plurality of battery cells coupled with the protective circuit, the plurality of battery cells including at least two battery cells and being coupled in series and in parallel, at least two current limiting devices each coupled between at least two battery cells coupled in parallel among the plurality of battery cells, and a switch coupled in parallel to a current limiting device at a high current end of the plurality of battery cells from among the at least two current limiting devices.

The protective circuit may be configured to measure voltages of at least two battery cells coupled in series among the plurality of battery cells.

The switch may be turned on while charging or discharging the plurality of battery cells and may be turned off when measuring voltages of at least two battery cells coupled in series among the plurality of battery cells.

The protective circuit may be configured to compare measured voltages with a reference voltage, and turn off a charge-discharge switch that controls charging or discharging of the plurality of battery cells or blow a fuse on a high current path (HCP) of the plurality of battery cells when the difference between any of the measured voltages and the reference voltage is equal to or greater than a first threshold value.

According to one or more embodiments of the present invention, a method of controlling a battery pack including a plurality of battery cells and a protective circuit includes: limiting current flowing between at least two battery cells coupled in parallel among the plurality of battery cells coupled in series and in parallel; measuring voltages of at least two battery cells coupled in series among the plurality of battery cells; and determining whether there is an abnormal cell by comparing measured voltages with a reference voltage.

The method may further include turning off a charge-discharge switch that controls charging or discharging of the plurality of battery cells when a difference between any of the measured voltages and the reference voltage is greater or equal to a first threshold value.

The method may further include blowing a fuse on a high current path (HCP) of the plurality of battery cells when a difference between any of the measured voltages and the reference voltage is greater or equal to a first threshold value.

The limiting of the current flowing between the at least two battery cells may further include releasing limited current flow at a high current end of the plurality of battery cells while charging or discharging the plurality of battery cells.

BRIEF DESCRIPTION OF THE DRAWINGS

These and/or other aspects of the present invention will become apparent and more readily appreciated from the following description of the embodiments, taken in conjunction with the accompanying drawings of which:

FIG. 5 is a flowchart illustrating a method of controlling a battery pack, according to an embodiment of the present invention.

DETAILED DESCRIPTION

Hereinafter, exemplary embodiments of the present invention will be described more fully with reference to the accompanying drawings. In the description, the detailed descriptions for understanding operations according to embodiments of the present invention have been provided, and other unnecessary descriptions may have been omitted so as not to hinder the understanding of embodiments of the present invention.

In addition, the terminology used in the specification and claims below should not be construed as being limited to a general or dictionary meaning; rather, the terminology should be construed in light of the entire disclosure of the embodiments of the present invention.

Figure 1:
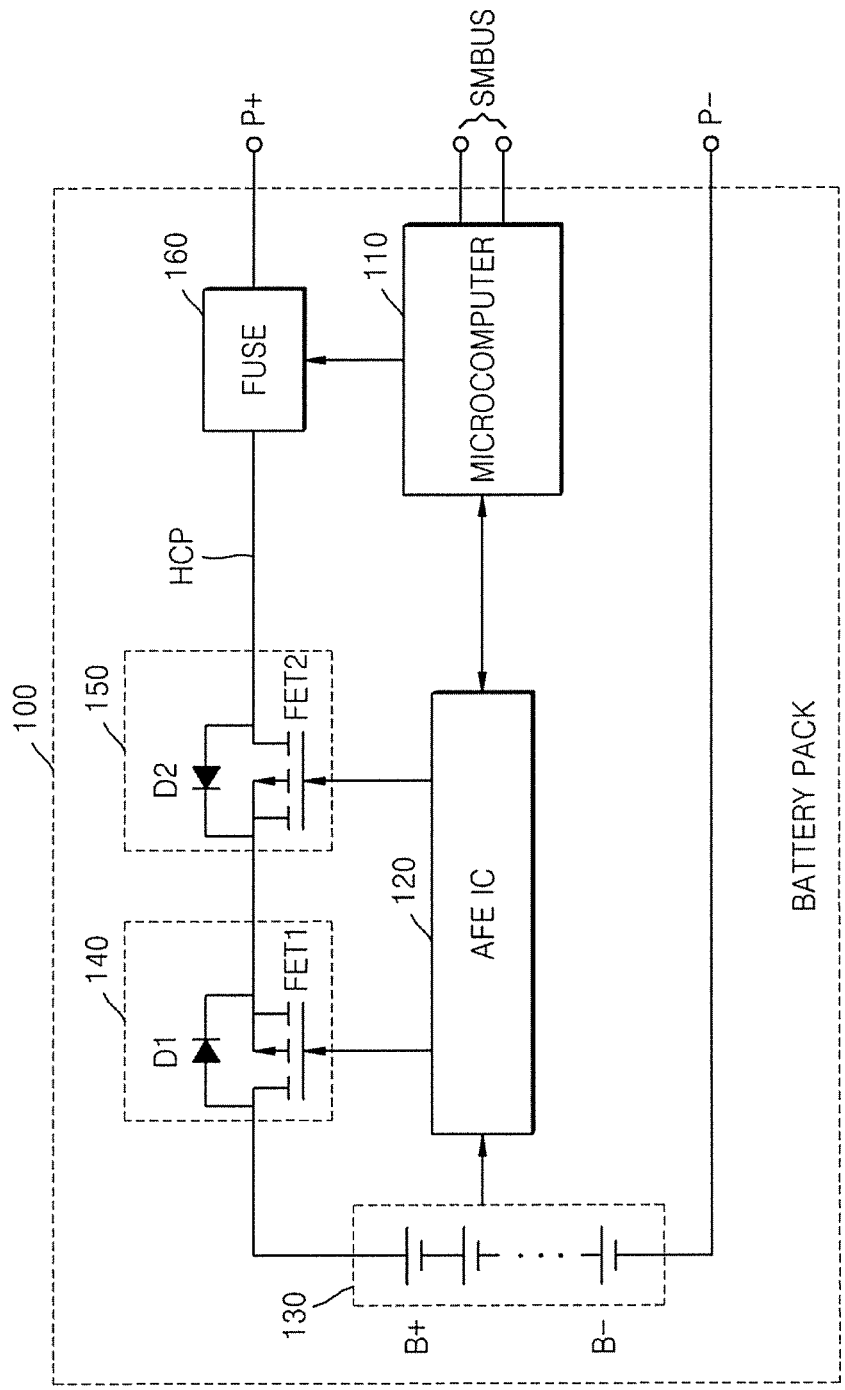
FIG. 1 is a circuit diagram of a battery pack according to an embodiment of the present invention.

FIG. 1 is a circuit diagram of a battery pack 100 according to an embodiment of the present invention.

Referring to FIG. 1, the battery pack 100 according to one embodiment of the present invention includes a rechargeable battery cell 130 and a protective circuit, and the battery pack 100 is included in an external system, such as a laptop computer, that may charge and discharge the battery cell 130.

The battery pack 100 includes the battery cell 130, an external terminal coupled in parallel to the battery cell 130, a charge device 140 and a discharge device 150 coupled in series in a high current path (HCP) between the battery cell 130 and the external terminal, a fuse 160 coupled in series in the HCP between the discharge device 150 and the external terminal, an analog front end (AFE) integrated circuit (IC) 120 coupled in parallel to the battery cell 130, the charge device 140, and the discharge device 150. The protective circuit includes a microcomputer 110 having one end coupled to the AFE IC 120 and another end coupled to the fuse 160. Also, the battery pack 100 may further include a self protection control device for blowing or tripping the fuse 160 under the control of the microcomputer 110 or an external system.

When the microcomputer 110 determines that the battery cell 130 is over-charged or over-discharged, the microcomputer 110 prevents further over-charge and over-discharge of the battery cell 130 by turning off the charge device 140 and the discharge device 150 or blowing the fuse 160. In one embodiment, when the microcomputer 110 determines that the battery cell 130 is overcharged or overdischarged, the microcomputer 110 outputs a corresponding control signal to blow the fuse 160 via a control switch or a heater.

The battery pack 100 is charged or discharged by being coupled to the external system through the external terminal. The HCP between the external terminal and the battery cell 130 is a charge-discharge path, and a high current flows through the HCP. The battery pack 100 may further include a system management BUS (SMBUS) between the microcomputer 110 of the protective circuit and the external terminal in order to communicate with the external system.

The external system coupled to the external terminal of the battery pack 100 may be a portable electronic device, for example, a laptop computer, and may separately include an adaptor for supplying power. When the external system is coupled to the adaptor, the external system may be powered by using the adaptor, and the adaptor may supply power to the battery cell 130 through the external terminal and the HCP, thereby charging the battery cell 130. When the external system is separated from the adaptor, the battery cell 130 may be discharged by a load of the external system through the external terminal. That is, when the external system is coupled to the external terminal and the adaptor, a charging operation occurs and a charging path thereof reaches the battery cell 130 through the adaptor, the external terminal, the discharge device 150, and the charge device 140. When the adaptor is separated from the external system, and the load of the external system is coupled to the external terminal, a discharging operation occurs and a discharging path thereof reaches the load through the battery cell 130, the charge device 140, the discharge device 150, and the external terminal.

The battery cell 130 is a chargeable and dischargeable secondary battery cell. In FIG. 1, B+ and B− indicate power terminals of the battery cell 130. The battery cell 130 outputs cell related information to the AFE IC 120, which will be described in more detail below, wherein the cell related information includes, for example, a cell temperature, a cell charge voltage, and an amount of current flowing in the battery cell 130.

The charge device 140 and the discharge device 150 are coupled in series in the HCP between the external terminal and the battery cell 130, and respectively charges and discharges the battery pack 100. In one embodiment, the charge device 140 and the discharge device 150 each include one or more field effect transistors (FETs).

The AFE IC 120 is coupled in parallel to the battery cell 130 and is coupled in series between the battery cell 130 and the microcomputer 110. The AFE IC 120 measures a voltage of the battery cell 130, transfers the measurement to the microcomputer 110, and controls operation of the charge device 140 and the discharge device 150 under the control of the microcomputer 110.

In one embodiment, the microcomputer 110 is an IC coupled in series between the AFE IC 120 and the external system, and functions to prevent over-charge, over-discharge, and over-current of the battery cell 130 by controlling the charge device 140 and the discharge device 150 via the AFE IC 120. In one embodiment, the microcomputer 110 compares the voltage of the battery cell 130, which is measured by and received from the AFE IC 120, with a voltage level value that is internally set, outputs a control signal to the AFE IC 120 according to a result of the comparison, turns the charge device 140 and the discharge device 150 on or off accordingly, and thus prevents over-charge, over-discharge, and/or over-current of the battery cell 130.

For example, if the voltage of the battery cell 130, which is transferred to the microcomputer 110, is equal to or greater than an internally set over-charge level voltage value, for example, about 4.35 V, the microcomputer 110 determines that the battery cell 130 is in an over-charged state, the microcomputer 110 outputs a corresponding control signal to the AFE IC 120, and then the AFE IC 120 turns off a switch FET1 of the charge device 140. Thus, charging of the battery cell 130 by the adaptor of the external system is blocked or prevented. On the other hand, if the voltage of the battery cell 130, which is transferred to the microcomputer 110, is equal to or less than an internally set over-discharge level voltage value, for example, about 2.30 V, the microcomputer 110 determines that the battery cell 130 is in an over-discharged state, the microcomputer 110 outputs a corresponding control signal to the AFE IC 120, and then the AFE IC 120 turns off a switch FET2 of the discharge device 150. Thus, discharging of the battery cell 130 by the load of the external system is blocked or prevented. Here, the AFE IC 120 controls switching of the charge device 140 and the discharge device 150 under the control of the microcomputer 110. However, the microcomputer 110 may directly control switching of the charge device 140 and the discharge device 150.

Figure 2:
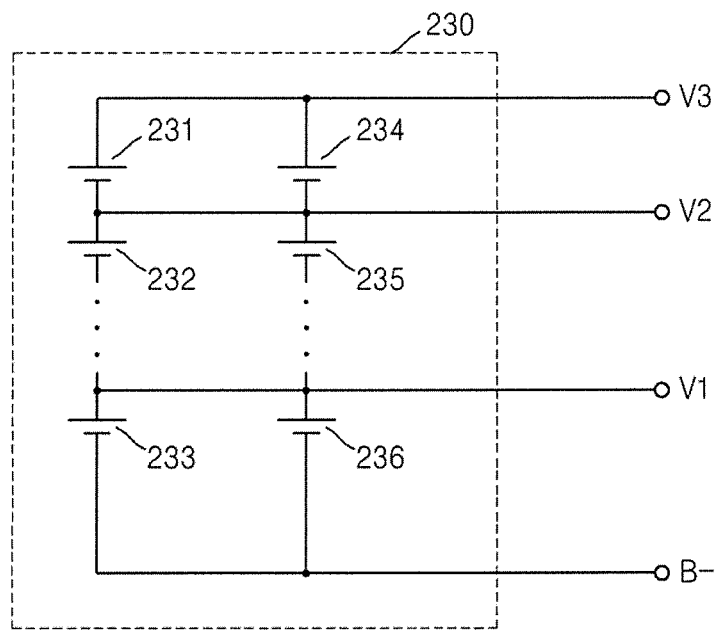
FIG. 2 is a diagram illustrating a connection of a plurality of battery cells of FIG. 1 and measured voltages of the battery cells.

FIG. 2 is a diagram illustrating a connection of a plurality of battery cells 231 through 236 that may be included in the battery cell 130 of FIG. 1 and measured voltages of the battery cells 231 through 236.

Referring to FIGS. 1 and 2, the plurality of battery cells 231 through 236 are coupled to each other in series and in parallel. Here, a voltage V3 of the battery cells 231 and 234, a voltage V2 of the battery cells 232 and 235, and a voltage V1 of the battery cells 233 and 236, which are voltages of pairs of battery cells coupled in parallel, are each measured by the AFE IC 120, and the measured voltages V1, V2, and V3 are transferred to the microcomputer 110. Here, the measured voltages V1, V2, and V3 are the voltages of the pairs of battery cells coupled in parallel. The microcomputer 110 determines whether there is over-charge or over-discharge of the battery cells 231 through 236 by comparing the measured voltages V1, V2, and V3 with a reference voltage. Also, the microcomputer 110 performs protective measures for the battery pack 100, for example, turns off the charge device 140 or the discharge device 150, or blows/trips the fuse 160 according to a set reference level. However, when the voltages V1, V2, and V3 of the pairs of battery cells coupled in parallel are measured, the sensed voltages V1, V2, and V3 may not represent the actual states of the battery cells. For example, if the battery cell 232 has a low voltage, the battery cell 232 may be automatically charged by the battery cell 235, which is coupled in parallel to the battery cell 232, and thus it is difficult to identify that the battery cell 232 is in a low-voltage state. In FIG. 2, two battery cells are coupled in parallel; however, when more battery cells, for example, four battery cells, are coupled in parallel in order to increase capacity of the battery pack, it is even more difficult to identify which of the four battery cells has a defect or is in a low-voltage state.

Figure 3:
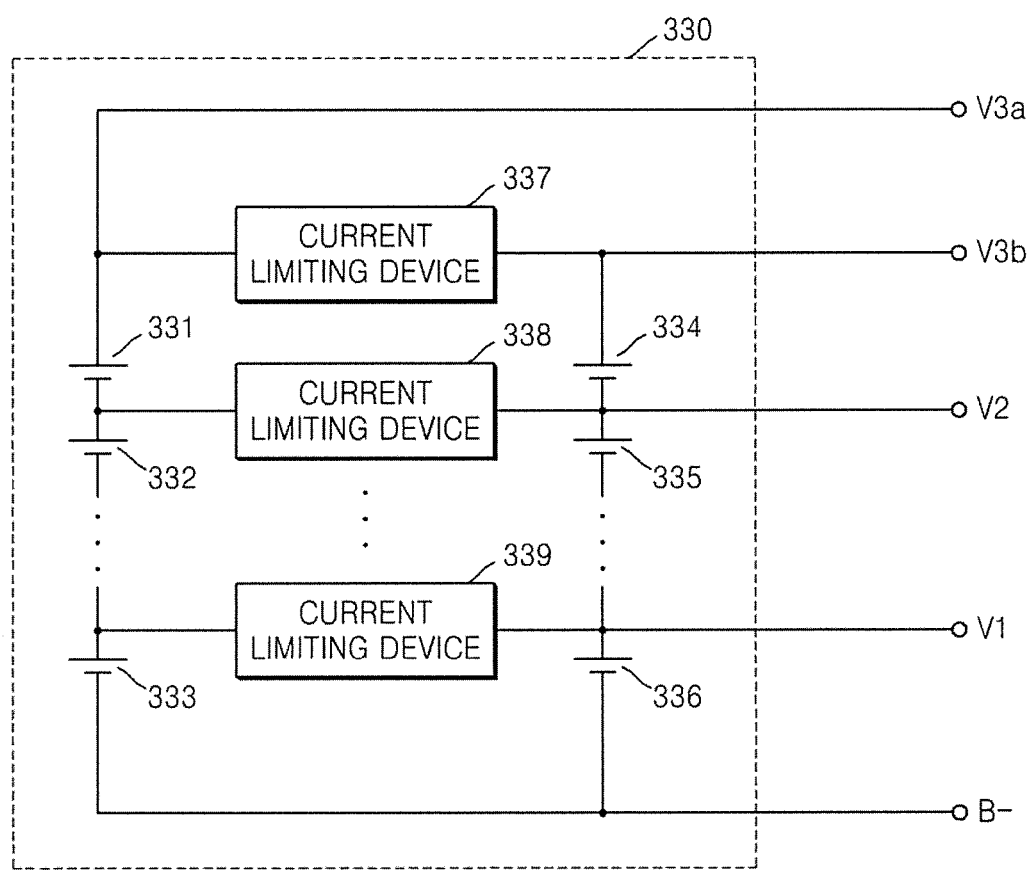
FIG. 3 is a circuit diagram of a battery pack according to another embodiment of the present invention.

FIG. 3 is a circuit diagram of a battery pack according to another embodiment of the present invention.

Referring to FIG. 3, a plurality of battery cells 331 through 336 are coupled to each other in series and in parallel, and current limiting devices 337 through 339 are respectively coupled between the battery cells 331 and 334, 332 and 335, and 333 and 336, wherein the battery cells 331 and 334, 332 and 335, and 333 and 336 are each pairs of battery cells coupled in parallel. Thus, as currents flowing between the pairs of battery cells coupled in parallel are blocked, a battery cell in a low-voltage state may be prevented from being automatically charged by a battery cell coupled in parallel to the battery cell in a low-voltage state.

Referring to FIGS. 1 and 3, the plurality of battery cells 331 through 336 are coupled to each other in series and in parallel, and the current limiting devices 337 through 339 are respectively coupled between the battery cells 331 and 334, 332 and 335, and 333 and 336. Here, a voltage V3a of the battery cells 331, 332, and 333 coupled in series and a voltage V3b of the battery cells 334, 335, and 336 coupled in series are measured by the AFE IC 120, and the measured voltages V3a and V3b are transferred to the microcomputer 110. Here, the measured voltages V3a and V3b are each a voltage of a set of battery cells coupled in series. The microcomputer 110 determines whether there is over-charge or over-discharge of the battery cells 331 through 336 by comparing the measured voltages V3a and V3b with a reference voltage. Also, the microcomputer 110 performs protective measures for the battery pack 100, for example, turns off the charge device 140 or the discharge device 150, or blows the fuse 160 according to a set reference level. For example, when the battery cell 332 is unbalanced or in a low-voltage state, the voltage V3a of the set of battery cells coupled in series is measured and is compared with the reference voltage, and thus abnormality of the battery cell 332 may be identified. For example, if a normal voltage of each of the plurality of battery cells 331 through 336 is about 3 V, when the voltage of the battery cell 332 is 2.8 V, and the voltage of the battery cell 335 is 3.2 V, the battery cell 332 is in an over-discharged state and the battery cell 335 is in an over-charged state. In this case, when the voltages of the pairs of battery cells coupled in parallel are measured as in FIG. 2 without the current limiting devices, the voltage across all of the battery cells 331 through 336 is 9 V, and thus it may be determined that the voltage of each pair of battery cells coupled in parallel is a normal voltage. However, in FIG. 3, when the voltages V3a and V3b of the sets of battery cells coupled in series are measured, V3a is 8.8 V and V3b is 9.2 V. Thus, it is determined that the voltages V3a and V3b are both not a normal voltage of 9.0 V. That is, when the measured voltages V3a and V3b of the sets of battery cells coupled in series are respectively 8.8 V and 9.2 V, the reference voltage is 9 V, and a threshold value for determining a difference between the measured voltages V3a and V3b and the reference voltage is 0.2 V, since the differences between the measured voltages V3a and V3b and the reference voltage are over ±0.2 V, it is determined that the measured voltages V3a and V3b are not normal voltages. Thus, protective measures may be performed, for example, charging and discharging may be prevented, or the fuse 160 may be blown.

The current limiting devices 337 through 339 illustrated in FIG. 3 may be resistors or may be, in one embodiment, positive temperature coefficient (PTC) devices. The PTC devices are devices having positive temperature coefficients in which resistance values thereof are rapidly increased in response to temperature increase above a set temperature. In some embodiments, the PTC devices include N-type semiconductors mainly formed of $BaTiO_3$ having conductivity by adding a dopant thereto. In one embodiment of the present invention, the current limiting devices 337 through 339 may be resistors or PTC devices; however, the present invention is not limited thereto. The current limiting devices 337 through 339 each may be any device that may limit current flowing between a pair of battery cells coupled in parallel.

Figure 4:
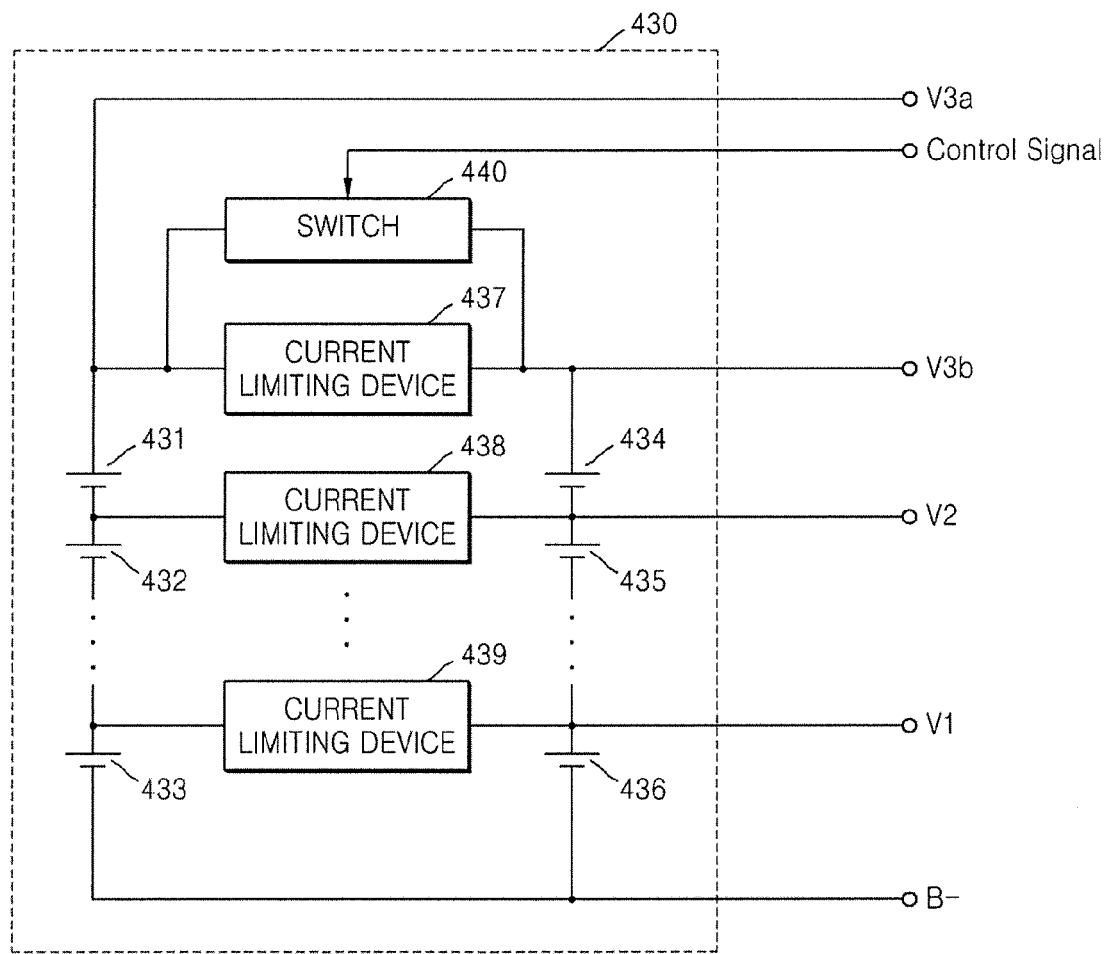
FIG. 4 is a circuit diagram of a battery pack according to another embodiment of the present invention.

FIG. 4 is a circuit diagram of a battery pack including a battery cell 430 according to another embodiment of the present invention.

Referring to FIG. 4, a plurality of battery cells 431 through 436 are coupled to each other in series and in parallel, and current limiting devices 437 through 439 are respectively coupled between the battery cells 431 and 434, 432 and 435, and 433 and 436, wherein the battery cells 431 and 434, 432 and 435, and 433 and 436 are pairs of battery cells coupled in parallel. Also, a switch 440 is coupled in parallel to the current limiting device 437. That is, as currents flowing between the pairs of battery cells coupled in parallel are blocked by the current limiting devices, a battery cell in a low-voltage state may be prevented from being automatically charged by a battery cell coupled in parallel to the battery cell in a low-voltage state. Also, the switch 440 is turned on while charging or discharging the battery cell 430 so as to short the current limiting device 437 to shunt current flow around the current limiting device 437 so that a charge current to or a discharge current from the battery cell 430 is not prevented. Accordingly, a high current can flow out from an end of the battery cell 431 or battery cell 434 without being limited by the current limiting device 437. That is, the switch 440 is turned off when detecting the voltage of the battery cell 430 and is turned on when charging or discharging the battery cell 430 so as to release current limitation.

The other current limiting devices 438 and 439 may be further coupled to the switch 440 in parallel according to setting of the switch 440. Also, the switch 440 may be an FET and may be turned on or off by a control signal, wherein the control signal may be transferred from the AFE IC 120 or the microcomputer 110 illustrated in FIG. 1.

FIG. 5 is a flowchart illustrating a method of controlling a battery pack, according to an embodiment of the present invention.

Referring to FIG. 5, in operations 500 and 502, current flowing between at least two battery cells coupled in parallel among at least two battery cells coupled in series and parallel is limited. Here, current limiting devices, for example, PTC devices, are respectively coupled between the at least two battery cells coupled in parallel, and thus the current flowing between the battery cells coupled in parallel is limited due to resistances of the PTC devices that increase according to a rise in temperature of the battery cells.

In operation 504, whether the battery cells are in a charged or discharged state is determined. When it is determined that the battery cells are in a charged or discharged state, in operation 504, the limited current flow at a high current end is released, in operation 514. Thus, a charge current to or a discharge current from the battery cells is not limited.

When it is determined that the battery cells are not in a charged or discharged state, in operation 504, whether the voltages of the battery cells are measured is determined, in operation 506. The voltages of the battery cells may be periodically or non-periodically measured by a protective circuit. In operation 502, since the current flowing between the at least two battery cells coupled in parallel is blocked, the at least two battery cells coupled in series and in parallel become sets of battery cells coupled in series. In operation 508, the voltages of the sets of battery cells coupled in series are measured. Since the battery cells are not coupled in parallel, the battery cells are prevented from automatically charged by each other. Accordingly, the voltages of the sets of battery cells coupled in series may be measured to determine whether there is a battery cell that is unbalanced or in a low-voltage state. In this regard, the measured voltages are compared with a reference voltage, in operation 510. When the difference between the measured voltages, which are the voltages of the sets of battery cells coupled in series, and the reference voltage is equal to or greater than a first threshold value, a charge-discharge switch is turned off or a fuse on an HCP is blown, in operation 512. Thus, stability of the battery pack may be secured. Here, the first threshold value may be a determined suitable value and may vary according to design specification for stability of the battery pack. For example, when any one of the measured voltages of the sets of battery cells coupled in series is measured as 8.8 V or 9.2 V, and when the difference between the measured voltage and the reference voltage, for example, 9 V, is about 0.2 V, it is determined that the measured voltage is not a normal voltage. Accordingly, protective measures may be performed, charging and discharging may be prevented, or the fuse may be blown.

As described above, according to the one or more of the above embodiments of the present invention, the battery pack may accurately determine whether there is an abnormal battery cell.

Also, in a plurality of battery cells coupled in series and in parallel, currents flowing between battery cells coupled in parallel are blocked when voltages of the battery cells are measured, and thus a battery cell in a low-voltage state may be prevented from being automatically charged through a battery cell coupled in parallel to the battery cell in a low-voltage stage. Also, voltages of sets of battery cells coupled in series are each detected to accurately determine whether there is an abnormal battery cell. When an abnormal battery cell is detected, appropriate protective measures are performed, thereby improving stability of the battery pack.

In one embodiment, the present invention can be embodied as computer readable codes on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, and optical data storage devices. The computer readable recording medium may also be distributed over network coupled computer systems so that the computer readable code is stored and executed in a distributed fashion.

It should be understood that the exemplary embodiments described therein should be considered in a descriptive sense only and not for purposes of limitation. Descriptions of features or aspects within each embodiment should typically be considered as available for other similar features or aspects in other embodiments.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

What is claimed is:
1. A battery pack comprising:
a protective circuit;
a plurality of battery cells coupled with the protective circuit, the plurality of battery cells being coupled in series and in parallel;

a plurality of current limiting devices each coupled between corresponding battery cells that are coupled in parallel among the plurality of battery cells; and at least one switch coupled in parallel to at least one of the current limiting devices, the at least one switch comprising a first terminal coupled to a first terminal of the at least one of the current limiting devices, and a second terminal coupled to a second terminal of the at least one of the current limiting devices, wherein the protective circuit is configured to measure voltages of at least two battery cells coupled in series among the plurality of battery cells, wherein the switch is turned off when measuring voltages of at least two battery cells coupled in series among the plurality of battery cells, and wherein the protective circuit is configured to compare measured voltages with a reference voltage, and turn off a charge-discharge switch that controls charging or discharging of the plurality of battery cells or blow a fuse on a high current path (HCP) of the plurality of battery cells when a difference between any of the measured voltages and the reference voltage is equal to or greater than a first threshold value.

2. The battery pack of claim 1, wherein the plurality of current limiting devices comprises at least two current limiting devices each being coupled to at least two battery cells coupled in parallel among the plurality of battery cells.

3. The battery pack of claim 1, wherein the switch is turned on while charging or discharging the plurality of battery cells.

4. The battery pack of claim 1, wherein the switch comprises a field effect transistor (FET).

5. The battery pack of claim 1, wherein the current limiting devices comprise positive temperature coefficient (PTC) devices.

6. The battery pack of claim 1, wherein the current limiting devices comprise resistors.

7. A battery pack comprising:

a protective circuit;

a plurality of battery cells coupled with the protective circuit, the plurality of battery cells comprising at least two battery cells and being coupled in series and in parallel;

at least two current limiting devices each coupled between at least two battery cells coupled in parallel among the plurality of battery cells; and a switch coupled in parallel to a first current limiting device at a high current end of the plurality of battery cells from among the at least two current limiting devices, the switch comprising a first terminal coupled to a first terminal of the first current limiting device, and a second terminal coupled to a second terminal of the first current limiting device, wherein the switch is turned on while charging or discharging the plurality of battery cells and is turned off when measuring voltages of at least two battery cells coupled in series among the plurality of battery cells, and wherein the protective circuit is configured to compare measured voltages with a reference voltage, and turn off a charge-discharge switch that controls charging or discharging of the plurality of battery cells or blow a fuse on a high current path (HCP) of the plurality of battery cells when the difference between any of the measured voltages and the reference voltage is equal to or greater than a first threshold value.

8. The battery pack of claim 7, wherein the protective circuit is configured to measure voltages of at least two battery cells coupled in series among the plurality of battery cells.

* * * * *